Sept. 10, 1929.  S. TRANIN  1,727,493
YOLK SEPARATING DEVICE
Filed Nov. 22, 1926
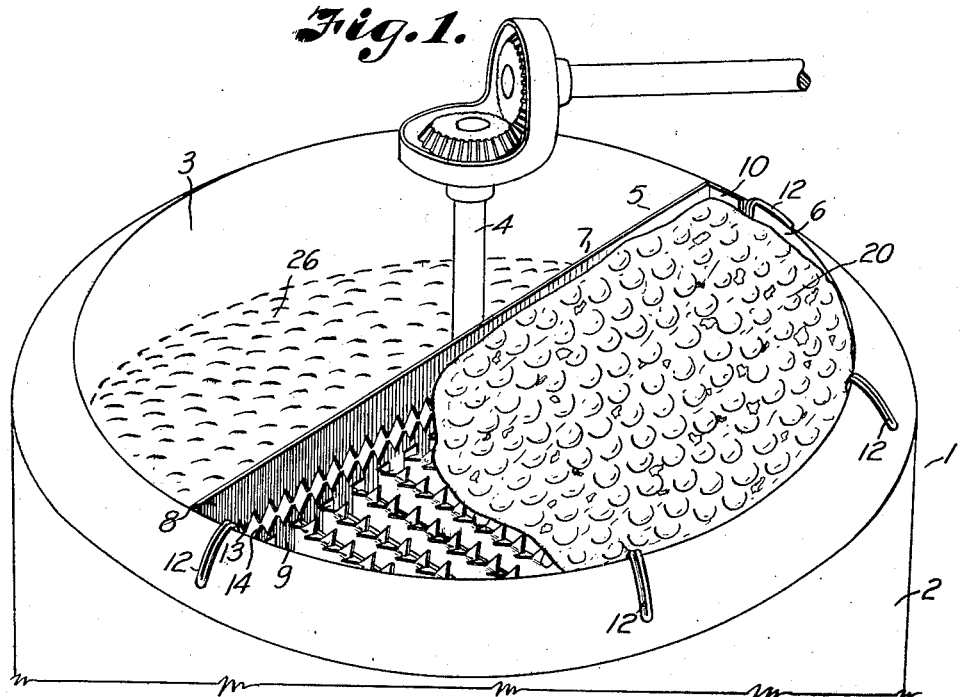
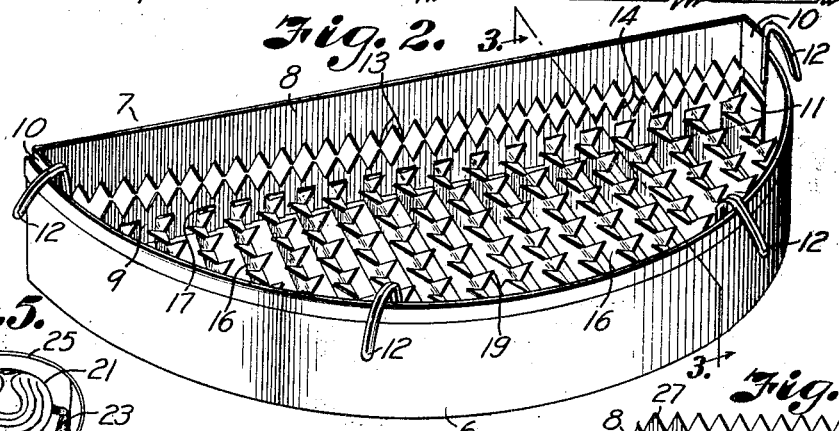
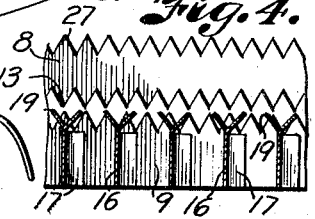
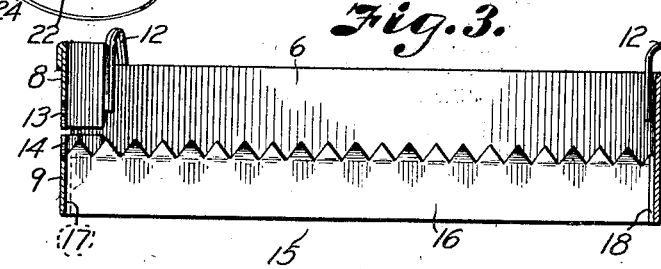
INVENTOR
Samuel Tranin.
BY
ATTORNEY Patented Sept. 10, 1929.

1,727,493

UNITED STATES PATENT OFFICE.

SAMUEL TRANIN, OF KANSAS CITY, MISSOURI.

YOLK-SEPARATING DEVICE.

Application filed November 22, 1926. Serial No. 149,981.

My invention relates to equipment used in the egg-distributing industry and more particularly to apparatus for the preparation of the contents of eggs for commerce and industry, including the devices commonly called "churns".

I propose to provide a method of handling egg yolks, and a device employing such method, especially adapted for use with yolk-mixing churns, but which may be used for analogous purposes in other relations, and which is designed to facilitate the preparation of yolks for market, and to improve the quality of the product.

An important phase of the egg-distribution industry is the marketing of separated yolks. There is a large demand for such separated yolks, in the baking industry and in various lines of manufacture; the whites, reserved from the yolk mass, having also a market. In present practice, properly selected eggs are manually broken, and the separation is accomplished by well-known methods, the yolks being deposited in one receptacle, the whites in another, the shells elsewhere. The yolks vary widely in color and other characteristics. They are also relatively individualized in the aggregation, since the skin of a yolk, even when broken during separation or from the shock of deposit, restrains portions of the yolk from dispersion. Associated with the pure yolks, and their skins, in the aggregation are also the chalazae, called "gristle" in the industry, or hardened albuminous spiral cords securely attached to the yolk skin, and also quantities of the whites that had accidentally passed over with the yolks in the process of separation. There may also be particles of the outer skin of the egg, and bits of the shell hanging to such skin. The most expert separators cannot, it is said, completely segregate the yolk from all particles of the whites in commercial practise; and even the most efficient separation results in the deposit of the "gristle" in the yolk aggregation, since it is so securely attached to the yolk skin. A mass of yolk is produced, therefore, which lacks desired uniformity in color and texture; and which also because of the presence of the skins and "gristle" lacks the uniform consistency and homogeneity that is desirable for appearance and packaging and for manipulation by the ultimate user. The industry therefore provides a treatment for the aggregation of yolks. The mass of yolks, non-homogeneous as described, is deposited in a "churn" comprising a bowl and a rotary agitator the duty of which is to mix the elements of the mass thoroughly, meanwhile breaking up the yolk skins and the "gristle" so as to bring about a condition of relative uniformity in consistency, color and other characteristics in the said mass. Obviously, however, the "gristle", the skins of the yolks, and the volume of the whites, all as originally present in the receptacle into which the yolks were separated, are still present. There may also be bits of shell referred to above, accidentally entangled with the separated yolks, and further broken up through the agitation.

The rotary agitator ordinarily operates at, for example, 300 revolutions per minute; consequently aerating and beating up the yolks, and the entangled whites, to an appreciable degree.

The yolk product so produced is ordinarily wholesome and useful for its purpose.

My method aims at the elimination of all extraneous substances form the separated yolks, and the production of a pure yolk commodity without excessive agitation. I offer for the purpose a basket of suitable metal adapted to be suspended in a yolk churn and having points and hooks so disposed as to entangle and retain certain elements of an agglomerate deposited therein, and having perforations so disposed as to permit free passage of the contents of the yolk skin. The points puncture the membrane containing the yolk, releasing it for such passage; the hooks retaining the membrane and the "gristle" attached thereto; the shreds of whites and the particles of shell, that may have traveled with the yolk skins, being also restrained from passage. The pure yolk substance that reaches the bowl of the churn is a homogeneous mass, substantially of uniform consistency, and more or less mottled in appearance from the fact of different colors of the individal yolks. A degree of agitation, for example at 90 revolutions per minute, is sufficient to mix the yolks adequately for attaining complete uniformity of color and consistency.

The structure of my device and its operation in accordance with my method, will be more specifically described with references to the accompanying drawings in which:

Fig. 1 represents the upper portion of a churn equipped with my device, and containing a yolk agglomerate part of which is broken away to disclose the bottom of the device.

Fig. 2 is a perspective view of my device.

Fig. 3 is a cross sectional view on the line 3—3 of Fig. 2.

Fig. 4 is a modified form of a cross member.

Fig. 5 represents an egg and substances thereof referred to in the description.

Referring more in detail to the drawings:

1 designates a churn having a circular wall 2 and a well portion 3 in which is mounted a rotating agency 4 for inducing such movements of parts as will bring about the desired mixing and agitation of the substances deposited in the churn. 5 designates my device, a basket-like structure having the shape of a lateral half of a circular pan, and comprising a half-cylinder outer wall 6 and an inner or cross-wall 7 comprising upper and lower bars 8 and 9, the cross wall joining the ends of the semi-circular outer wall and secured thereto by end flanges 10 and 11 provided respectively for each bar. The basket is designed for suspension in a churn, the cross-wall having less length than the diameter of the churn and the semi-circular wall having a radius approximately that of the circular wall of the churn; the basket being supported near the upper edge of the churn by hooks 12 soldered to the semi-circular wall 6 of the basket.

The cross-wall 7 is provided with perforations constituted of adjacent spaced edges of bars 8 upper and 9 lower serrated to form teeth 13 and 14 for the upper and lower bars respectively.

The bottom 15 of the basket consists of a plurality of strips 16 spaced from and parallel to each other and perpendicular to the cross-wall; the strips being made a part of the basket by soldering flanges 17 on one end thereof to the lower bar 9 of the cross-wall, and attaching the opposite ends to the semi-circular wall of the basket by similar means as at 18.

The bottom of the basket-like device possesses special features, residing particularly in the structure and relations of the strips. These strips are provided with pointed hooks 19 on their upper edges, produced by regular continuous pointed indentation of the edges. These pointed hooks are diverted alternately on a strip, being turned on a circle having axis in the base line of the hooks to approximately 45 degrees from perpendicular. The disposition, size and shape of the pointed hooks may be varied, the points and hooks, the bars, and the strips, may be constructed of wire; but I have found the structure disclosed most efficient.

I may modify the form of the upper bar 8 of the cross-wall 7 of the basket, by providing it with pointed hooks on its upper edge, for a purpose to be disclosed.

My device being provided and installed in a yolk churn, yolk agglomerates designated 20 produced by the usual process of separation is deposited in the basket. The upper surface of the deposited agglomerate may project above the horizontal series of perforations in the cross-wall. The impact of deposit of the mass, and the weight of the integral yolks sinking after deposit of the mass causes the puncturing of the yolk membrane 21 (Fig. 5) by the sharp points of the hooks, the contained yolk 22 flowing freely thence into the bowl of the churn. The yolk membranes are retained on the hooks, the "gristle" 23 and particles of whites 24 and shells 25 being retained with the membrane.

When the yolk substance has departed from the agglomerate into the churn bowl, the rotary agitator is put into service to mix the yolk mass 26. The agitation need not be so violent as the change the normal condition of the yolks, since there are no membranes, gristles, stringy particles of whites, patches of outer skin, and bits of shell, to be broken up.

The modified form of cross-wall may be employed in cases where particularly large amounts of yolk are to be treated, and for assurance against overflow of unseparated parts of the yolk agglomerate over the cross-wall into the churn. The upper edge of the upper bar 8 of the cross-wall is shown in Fig. 4 as provided with pointed hooks 27 to puncture and entangle yolk skins in case of overflow. The upper edge of the cross-wall may in any case have lower altitude than the wall of the churn; and in use of the modified form has preferably lower altitude.

I produce, therefore, by my improved method and device, a pure yolk commodity, in a condition and form most easily and efficiently used by bakers and other manufacturers, and having known qualities on which the users can rely.

The device is useful also in the handling of a mass of "mixed eggs"; that is, a mass of yolks and whites obtained by depositing the two elements, unseparated, from the shell into a receptacle. "Mixed eggs" are prepared for market by agitation in a yolk churn for producing a commodity of relatively uniform nature. My device may be used to facilitate the said process, by supplying the mixed eggs to a churn through the basket, where the skins of the yolks will be punctured and the yolks therefore dispersed, relieving the agitator of the relatively difficult task of breaking up the skins and yolks by rotary agitation. In such use, the portion of the agglomerate remaining in the basket after passage of the yolks therethrough is delivered to the churn for mingling with the pure yolk portion so that the product will be "mixed eggs".

What I claim and desire to secure by Letters Patent is:

1. In a device of the class described, a basket including a side wall having serrations in one edge and a bottom comprising strips provided with projections, and extending perpendicularly from said wall.

2. In a device of the class described, a metal basket comprising an outside wall and a vertical inside wall comprising spaced bars provided with pointed hooks on their adjacent edges and a bottom comprising spaced strips provided with pointed hooks.

3. In a device of the class described, a container adapted to be suspended by hooks removably in a churn and comprising an impervious semi-circular wall and a perforated plane wall, the plane wall adapted to positioning horizontally and centrally of the churn and a bottom comprising spaced strips perpendicular to the plane wall and having diverted and staggered pointed projections in their upper edges.

4. In a device of the class described, a container adapted to be suspended removably in a churn and comprising an impervious semi-circular outside wall and a perforated plane inside wall, and a bottom comprising spaced strips provided with triangular upwardly diverging pointed hooks.

5. In a yolk separating device, a receptacle for egg yolks, and upwardly angularly extending projections in the receptacle for puncturing yoke skins and for retaining the skins and other portions of an egg while the yolk passes on.

6. In a yolk separating device, a container, an intersticed bottom for said container, and means on said bottom extending above the plane of the interstices for puncturing yolk skins and for retaining the skins and other portions of an egg while the yolk passes through the interstices of the bottom.

7. In combination with a churn, a container, and means for suspending the container in the churn, a bottom for said container comprising spaced strips, and oppositely diverted and staggered prongs on the upper edges of said strips for puncturing yolk skins and for retaining said skins and other portions of an egg while the yolk passes into the churn.

8. In a strainer including side walls, a bottom including spaced strips having upwardly angularly projecting prongs.

9. In combination with a frame including a bottom member including plates spaced to form passages for fluid and having upper edges comprising alternately oppositely diverted portions extending across the fluid passages.

10. In a basket of the character described, side walls including a member having prongs on its upper edge and a bottom including plates having staggered prongs.

In testimony whereof I affix my signature.

SAMUEL TRANIN.